United States Patent [19]

Grossman et al.

[11] 4,371,632

[45] Feb. 1, 1983

[54] COMPOSITIONS, PROCESSES, AND WRITING ELEMENTS EMPLOYING RESINS OF THE THERMOSETTING TYPE

[75] Inventors: Harold Grossman, Silver Spring, Md.; Richard E. Merrill, Wakefield; Paul B. Monaghan, Lexington, both of Mass.

[73] Assignee: Empire Enterprises, Inc., Shelbyville, Tenn.

[21] Appl. No.: 257,246

[22] Filed: Apr. 24, 1981

[51] Int. Cl.$^3$ .................. C08K 3/04; C09D 13/00
[52] U.S. Cl. ........................... 523/164; 106/19; 106/27; 524/496; 524/594
[58] Field of Search ............ 106/19, 27; 260/19 R, 260/19 N, 38; 523/164; 524/594, 496

[56] References Cited

U.S. PATENT DOCUMENTS

| | | | |
|---|---|---|---|
| 941,605 | 11/1909 | Baekeland | 260/38 |
| 1,019,407 | 3/1912 | Baekeland | 260/38 |
| 1,102,631 | 7/1914 | Aylsworth | 260/38 |
| 1,137,373 | 4/1915 | Aylsworth | 260/38 |
| 1,343,575 | 6/1920 | Nash | 260/38 |
| 1,358,394 | 11/1920 | Redman et al. | 260/38 |
| 1,697,885 | 1/1929 | Seeback | 260/38 |
| 2,253,235 | 8/1941 | Hempel | 260/30 |
| 2,280,988 | 4/1942 | Weiser | 260/19 N |
| 2,330,106 | 9/1943 | Bernstein et al. | 288/29 |
| 2,380,126 | 1/1945 | Sturm | 260/738 |
| 2,384,521 | 9/1945 | Andersen et al. | 18/55 |
| 2,441,047 | 5/1948 | Wall | 260/38 |
| 2,566,753 | 9/1951 | Van Dusen, Jr. et al. | 106/19 |
| 2,606,888 | 8/1952 | Williams et al. | 260/59 |
| 2,784,164 | 3/1957 | Ahlman et al. | 260/19 N |
| 2,834,745 | 5/1958 | Weber et al. | 260/32.8 |
| 2,897,171 | 7/1959 | Cserny et al. | 260/32.8 |
| 2,965,514 | 12/1960 | Less et al. | 117/100 |
| 3,280,239 | 10/1966 | Ninneman | 264/176 |
| 3,295,165 | 1/1967 | Wallace | 18/12 |
| 3,303,253 | 7/1967 | Henry | 264/176 |
| 3,360,489 | 12/1967 | Grossman et al. | 260/23 |
| 3,558,560 | 1/1971 | Huck et al. | 260/59 |
| 3,624,038 | 11/1971 | Weldner | 260/53 R |
| 3,755,243 | 8/1973 | Emanuelson et al. | 260/38 |
| 3,834,910 | 9/1974 | Mukai et al. | 106/19 |
| 3,848,044 | 11/1974 | Hagiwara et al. | 264/176 F |
| 3,917,555 | 11/1975 | Worschech et al. | 260/31.4 R |
| 3,928,520 | 12/1975 | Shinomoto et al. | 264/42 |
| 3,928,526 | 12/1975 | Koyama | 264/236 |
| 3,931,386 | 1/1976 | Kimura et al. | 264/236 |
| 3,953,218 | 4/1976 | Pollard | 106/19 |
| 3,972,959 | 8/1976 | Koyama | 264/176 F |
| 3,978,012 | 8/1976 | Calkins | 260/19 N |
| 4,017,451 | 4/1977 | Ishida et al. | 106/19 |
| 4,020,040 | 4/1977 | Kattoh | 260/42.56 |
| 4,026,864 | 5/1977 | Diethelm et al. | 260/38 |
| 4,089,837 | 5/1978 | Luttinger et al. | 260/38 |
| 4,169,937 | 10/1979 | Vargiu et al. | 525/493 |
| 4,196,114 | 4/1980 | Funabiki et al. | 260/28 P |

FOREIGN PATENT DOCUMENTS

| | | | |
|---|---|---|---|
| 27-3363 | 8/1952 | Japan . | |
| 48-34831 | 10/1973 | Japan | 260/19 N |
| 49-12300 | 3/1974 | Japan . | |
| 50-158644 | 12/1975 | Japan . | |
| 52-39788 | 3/1977 | Japan . | |
| 54-23614 | 8/1979 | Japan . | |
| 55-106257 | 8/1980 | Japan | 260/19 N |
| 270271 | 4/1927 | United Kingdom . | |
| 391798 | 5/1933 | United Kingdom . | |
| 869302 | 5/1961 | United Kingdom | 260/19 N |

OTHER PUBLICATIONS

Alien Property Custodian-Ser. No. 286,693, published Apr. 20, 1943, (Schwappacher).
Chemical Abstracts, vol. 94, (1981), p. 91.
Alien Property Custodian-Ser. No. 211,388, published Apr. 20, 1943, (Menger).

*Primary Examiner*—Ronald W. Griffin
*Attorney, Agent, or Firm*—Shapiro and Shapiro

[57] ABSTRACT

A "cold-processed" thermoset plastic pencil lead is produced by extruding a composition formed by blending a mixture of a marking material, a phenolic novolac resin, a hardening agent, a plasticizer, and a lubricant. Blending, billeting, and extruding operations are performed at material temperatures that, in general, do not exceed about 200° F. The extrudate is cured at higher temperatures of, for example, 260° F. to 325° F.

31 Claims, No Drawings

COMPOSITIONS, PROCESSES, AND WRITING ELEMENTS EMPLOYING RESINS OF THE THERMOSETTING TYPE

BACKGROUND OF THE INVENTION

This invention relates to marking or writing elements and is particularly concerned with a "cold-processed" thermoset lead.

For many years the ceramic-type pencil leads, comprising principally graphite and clay that must be processed at temperatures as high as 2,000° F., have been predominant in the pencil industry. (See, e.g., the discussion of the manufacture of such leads in U.S. Pat. No. 3,360,489, assigned to the same assignee as the present invention.) More recently pencil leads employing thermoplastic resin binders have made substantial inroads in the domain of the ceramic leads. Some of the thermoplastic leads have approached parity with the ceramic leads in strength and writing qualities, but prior attempts to produce satisfactory pencil leads with a thermosetting resin system have failed. In general, prior thermoset pencil leads have been deficient in strength and/or writing qualities and have been difficult and expensive to manufacture.

BRIEF SUMMARY OF THE INVENTION

The present invention provides thermoset pencil leads, more generally thermoset marking or writing elements, having strength and writing qualities comparable to (in some respects even better than) the strength and writing qualities of ceramic lead. The invention employs a "cold process" for manufacturing writing or marking elements, that is, a process in which little if any external heat is required and where the process temperatures are substantially lower than those required heretofore.

A particular advantage of the invention is that most of the manufacturing apparatus conventionally used in the manufacture of ceramic lead may be utilized in the production of thermoset plastic lead.

Leads in accordance with the invention can be produced at the high production rates commonly employed in producing ceramic leads, and can be produced in a full range of hardness values.

Leads produced in accordance with the invention have good point strength and bending stiffness, have the ability to bond readily to a wood casing and the ability to withstand elevated temperatures without distortion, and, most importantly, have good writing qualities.

Briefly stated, in one of its broader aspects, the invention is concerned with a marking or writing element that is formed by blending a mixture of a marking material, a phenolic novolac resin, a resin hardener, a plasticizer, and a lubricant, to provide an extrudable composition, extruding the composition, and curing the extrudate.

DETAILED DESCRIPTION OF THE INVENTION

The marking or writing elements of the invention are particularly useful as a substitute or a replacement for conventional ceramic cores (leads) of wood pencils and will be referred to herein as thermoset plastic cores (or simply as thermoset cores).

A Preferred Core Composition

A preferred core composition of the invention is based on four major ingredients: marking material, thermosetting resin, plasticizer and lubricant. A preferred thermosetting resin is a powdered two-step phenolic novolac resin, designated FRJ-136, from Schenectady Chemical Company, which contains 8.9% hexamethylene tetramine (by weight) as a hardening or curing agent. The hexa content of the phenolic novolac has little effect on the cure rate of the resin. The cured hardness is the most noticeable effect from varying the hexa content. This resin has a melting point (Capillary Shrink) of 170° F., an Inclined Plate Flow at 125° C. of 43-45 mm, a Stroke Cure at 160° C. (320° F.) of 34-44 seconds, and a Sieve Analysis of 99.8% through a 200 mesh screen.

A preferred marking material for a black lead is a fine particle size flaked graphite, e.g., #920 from Asbury Graphite Co. A preferred plasticizer is a liquid plasticizer sold by Velsicol Chemical Corporation under the name Benzoflex ® P-200. This plasticizer, a polyethylene glycol dibenzoate, has proved to be particularly useful with phenolformaldehyde resins employed in the invention, imparting improved flexure and writing characteristics. It has a specific gravity of 1.158 at 25° C., exhibits a boiling point in the range of 217°-290° C. at 1 mm Hg, has an average molecular weight of 408, and has a viscosity of 101 cps at 20° C. A suitable less expensive grade Benzoflex ® plasticizer is Benzoflex ® 2-45 which is a diethylene glycol dibenzoate. This lower cost plasticizer has a specific gravity of 1.178 at 25° C. and a boiling point of 240° C. at 5 mm Hg. Its viscosity is 110 cps at 20° C.

A preferred lubricant is a mixture of micronized aluminium stearate, e.g., Medium Gel II (95% through 200 mesh screen, 150°-155° C. melting point, sold by Nuodex Division of Tenneco Chemicals, Inc.), and stearic acid (triple pressed). This preferred lubricant may comprise equal parts of aluminum stearate Med Gel II and stearic acid.

A preferred core composition formulation for a black lead is given below:

EXAMPLE 1

| Ingredients | Percent by Weight |
|---|---|
| Graphite 920 | 68.9 |
| Resin FRJ-136 | 14.1 |
| Benzoflex ® P-200 | 7.0 |
| Aluminum Stearate MG II | 5.0 |
| Stearic Acid (Triple Press) | 5.0 |
| Total | 100.0 |
| 1" Beam Strength (oz) | 40.5 |
| Point Strength (lbs) | 4.25 |
| Grade (Darkness) | 2½ |

Appropriate percentage ranges (by weight) for each major ingredients are as follows: marking material about 55-75%, phenolic novolac resin with hardener about 10-28%, plasticizer about 2-12%, and lubricant about 4-22%.

A Preferred Manufacturing Process

A preferred process for producing thermoset plastic cores in accordance with the invention employs conventional equipment used in processing ceramic lead. A novel aspect of the process is a cold mixing, blending, or compounding step using a high intensity mixer or kneader, such as a Kneadermaster, operated with cooling water (no external heat required). The frictional heat developed in this mixer is sufficient to melt and flux the phenolic resin, aluminum stearate-stearic acid blend and plasticizer in combination with the marking material to form a semifluid (pasty or heavy gummy) mass without the need for a volatile solvent. The temperature of the materials being mixed should not exceed about 175° F. Lower temperatures of about 150° F. to about 170° F. are preferred. A small amount of a volatile solvent can be used, but this would require an added step for drying (evaporation) of the solvent. The mixing and compounding operation is preferably carried out without the use of a volatile solvent or volatile plasticizer medium, such as the water required for ceramic lead production.

Upon removal from the Kneadermaster mixer, the blended thermosetting plastic core compound is cooled to room temperature, at which it assumes a crumbly solid state. The compound can be readily billeted cold in the equipment normally used for billeting the water-plasticized ceramic core compound, without heating. Finally, the billeted plastic core compound can be extruded (at 6000–8000 psi, approximately the same pressures used for ceramic lead) on the same equipment used for extruding ceramic lead and at equivalent rates (600–650 cuts/min for a standard lead length of 7¼"). The billet is preferably pre-heated to about 100°–120° F. (a microwave oven may be used) prior to loading into the extrusion pot of a conventional plunger-type extruder (no extrusion screw). The extrusion pot is heated to about 160° F. and the side arm and die to about 170° F. for extrusion at the high rates of 600–650 cuts/min. The temperature of the material fed to the die is thus about 150°–160° F. Other temperatures may be used but should not exceed a maximum of about 220° F. (preferably 200° F. max.) or pre-cure of the core compound will occur, leading to blockage of the side arm and die.

In accordance with the invention, a non-volatile plastic core compound can be extruded at low temperatures and at high production rates to provide a dense smooth extrudate free of volatiles. Actually, the core compound can be extruded at room temperature, but not at such high production rates. The freedom from volatiles eliminates the drying step required in the production of ceramic lead.

Whereas the dried ceramic lead must be fired at extremely high temperatures on the order of 2,000° F., the new plastic lead of the invention can be cured in a curing oven to the thermoset stage by simply heating at, e.g., 300° F. for 5 to 10 minutes or at 325° F. for less time. Considerable time may be required for the extruded leads to reach the curing temperature because of the mass of the product and the supporting structure introduced into the cure oven. Thus total time in an oven at 300° F. to 325° F. may be 30 minutes to one hour. A cure at 270° F. for one hour provides very satisfactory results with most formulations and is preferred.

As a specific example of the preferred manufacturing process above, the preferred core composition above was compounded in the production-size Kneadermaster of the assignee of the invention in the same general manner used for compounding ceramic core formulations, but without the need for water or other volatile solvents. A 270 lb batch was weighed out and added to the Kneadermaster in the following order: FRJ-136 resin (38 lbs), Aluminum Stearate Med Gel II (13.5 lbs), Stearic Acid (13.5 lbs), P-200 plasticizer (19 lbs), and de-aired graphite #920 (186 lbs). (Alternatively, the ingredients may be added at the same time.) The Kneadermaster was started after the addition of the P-200. The materials fluxed well and appeared to be quite fluid (putty-like). The temperature of the materials at this point was about 120° F. The de-aired graphite was added to the mix and the ram of the Kneadermaster lowered. Within 10 minutes the temperature of the batch had risen to 150° F., with water-cooling (using cool tap water). The mix was then fluxed for 2 minutes with the ram up and the temperature dropped to 145° F. The ram was lowered and raised again to maintain the temperature at 160° F. max. for about 15 minutes. The mix was then run open with the ram raised and with continued water-cooling until the mix was well broken up. The mix was then discharged into a tub and after cooling for about 2 hours in the open tub the material was directly billeted very easily in the standard billeting equipment used for ceramic lead, which employs a press to produce cylindrical billets of about 5" by 15". In other instances, the material was easily billeted after holding at room conditions for several days. The billets are easy to make, compact, free of entrapped air, can be stored stably, and become plastic at the low temperatures employed in the extrusion phase of the invention.

The core compound prepared and billeted as described above was later extruded in the normal plunger-type extruder used for extruding ceramic lead. This extruder comprises a cylindrical pot in which a plunger or piston is forced downwardly by a press to force material in the pot through a horizontal side arm and out of a die at the end of the side arm. The billeted core compound, preheated to 110° F., was extruded at about 6200 psi at a rate of about 650 cuts/min. In this extrusion operation, the side arm/die attachment of the extruder was warmed to 160° F. by band-type electrical heaters. The walls of the extrusion pot were similarly heated to approximately 160° F. Thus, with moderate heating, the thermoset plastic lead of the invention can be processed in the standard manner presently used for ceramic leads.

The extrudate was then cut into standard lengths by a conventional cutter used in cutting ceramic leads. Then the leads were conveyed on a belt conveyor, while being cooled by a stream of chilled air to about 110°–120° F., and loaded into cans (approx. 4 gross/can). The leads were straightened by rolling them at 110°–120° F. in the cans, which are the type used for drying ceramic leads. The leads were then held stationary (i.e., without rolling) in the cans while cured in an oven at an elevated curing temperature, e.g., 270° F. for one hour, the time it takes one can to traverse one rotation of a "ferris wheel" type support in the curing oven. Typical apparatus for this part of the process is described in U.S. Pat. No. 3,586,298, assigned to the assignee of the present invention. All waste or scrap material up to the time of cure can be re-cycled.

Characteristics and Functions of Core Ingredients

1. The marking material (graphite for black lead) produces the color required for writing. Graphite appears to function as a reinforcing filler to some extent in increasing the strength and stiffness of the core compound. A fine grade flaked graphite appears to produce a stronger and blacker lead than either a coarse flaked or an amorphous graphite.

2. The phenolic novolac resin (with its hardening agent) functions as a thermosetting plastic binder for the graphite. It is preferably a low melting point (preferably M.P. ≦170° F.) powdered resin in the uncured state and as such is readily compounded and extruded at low temperatures. It is compatible with the plasticizer and is preferably soluble in the plasticizer or plasticizer/lubricant at the mixing temperature (or the plasticizer/lubricant may be soluble in the resin) so that the resin, plasticizer, and lubricant readily blend at low mixing temperatures. The resin combines desirable low temperature fabrication capability with desirable properties in the cured lead, which include rigidity and good writing characteristics similar to a ceramic lead. Further, the cured resin bonds well to a wood casing with the conventional adhesives used by the wood pencil industry.

3. The plasticizer functions in several ways. It performs the function of increasing the flexural strength (beam strength) of the phenolic binder, which leads to better point strength, in particular, the needle point strength. It permits the phenolic/graphite core compound to be processed at low temperatures, improves the coating of the graphite particles by the binder because of its solvating power on the uncured resin and improves the darkness (grade) and smoothness of the resulting crosslinked thermoset lead. The plasticizer is preferably a liquid at room temperature, but if not, it should have a melting point less than the mixing temperature.

4. The lubricant functions as both an extrusion aid which allows the use of the low compounding temperatures and low extrusion temperatures in processing, and acts as an internal lubricant to enhance writing smoothness. In the particular lubricant described earlier, the ratio of the two ingredients is important, since too high percentage of stearic acid can cause exudation during the curing process. Exudation of the lubricant can interfere with the bond to the wood casing. On the other hand, excess aluminum stearate relative to stearic acid reduces lubricity during processing and reduces darkness during writing. Other grades of aluminum stearate, such as Low Gel (higher free stearic acid content) and High Gel (lower stearic acid content) can also be used, thereby allowing greater latitude in the aluminum stearate/stearic acid blend ratio. At least one component of the lubricant should have a melting point less than the mixing temperature. In the aluminum stearate/stearic acid blend, the stearic acid lowers the melting point of the aluminum stearate.

Examples of Principal Ingredients of Core Composition

A. Marking Materials

Examples of graphite materials that can be used (separately or in combination) include #920 (referred to earlier), #1845 (Asbury), #2095 (Southwestern), #508 (Asbury), and #1155 (Asbury). Pulverized petroleum coke (e.g., Asbury #4286) or pulverized anthracite coal (e.g., Asbury AC-6) may be substituted for a portion of the graphite (say 10%). The resulting cores tend to be lighter writing than the cores without the substitution and have a slightly "scratchy" ceramic feel in writing. Other types of marking materials, including pigments and dyes, for example, may be used in place of graphite. See, for example, the discussion of such materials in the aforementioned U.S. Pat. No. 3,360,489.

B. Thermosetting Resins (Binders)

In general, the resins preferred for use in the invention are the thermosetting phenolic novolac resins (i.e., those employed with or incorporating a hardening agent). Phenolic novolac resins are produced by the reaction of a phenol, such as phenol, cresol, resorcinol, or xylenol, with an aldehyde such as formaldehyde in the presence of an acid catalyst, such as sulfuric acid or oxalic acid, and with a molar ratio of aldehyde to phenol which does not exceed one. To render the resin thermosetting, methylene-donating hardening agents are employed, such as hexamethylene tetramine, paraformaldehyde and polyoxymethylene, which provide the additional methylene groups required to convert the fusible soluble phenolic novolac to the infusible, insoluble state. Hexamethylene tetramine is generally preferred. Suitable resins include, e.g., FRJ-136 (referred to earlier), SP-6201 (Schenectady), RI-1815 (Monsanto), and Durez #12687 (Durez Division of Hooker Chemical Co.). Combinations of resins may also be used. Resole type phenolics do not provide the high strength and good writing qualities of the novolac phenolics.

C. Plasticizers

Preferred plasticizers, and/or flexibilizers, for the phenolic novolac resin that can be used (separately or in combination) include polyethylene glycol dibenzoate (Benzoflex ® P-200), diethylene glycol dibenzoate (Benzoflex ® 2-45), and dipropylene glycol dibenzoate (Benzoflex ® 9-88). Other plasticizers may include, e.g., glycerine, diethylene glycol, and polyethylene glycols (carbowaxes) as well as glycerol derivatives such as glyceryl tribenzoate, glycerol monoacetate, glycerol diacetate, and glycerol triacetate, tricresyl phosphate and other phosphate-type plasticizers as well as phthalate types.

D. Lubricants

Preferred lubricants include (separately or in combination) Aluminum Stearate MG II, LG II, and HG II, with or without stearic acid (referred to earlier). Other lubricants may include e.g., oleic acid, aluminum oleate, calcium oleate, magnesium oleate, zinc oleate, lead stearate, zinc stearate, magnesium stearate, aluminum palmatate, natural acid synthetic waxes, fatty acids, fatty acid esters, fatty amides, fatty amide esters, and fatty alcohols as well as mixtures thereof. In some instances a plasticizer may also perform as a lubricant.

Further Examples of Thermoset Core Compositions for Black Leads

EXAMPLE 2

| Ingredients | Percent by Weight |
| --- | --- |
| Graphite 920 | 70.4 |
| Resin FRJ-136 | 14.4 |
| Benzoflex ® P-200 | 7.2 |
| Aluminum Stearate MG II | 4.0 |
| Stearic Acid (Triple Press) | 4.0 |
| Total | 100.0 |
| 1" Beam Strength (oz) | 38.6 |
| Point Strength (lbs) | 4.5 |
| Grade (Darkness) | 3 |

EXAMPLE 3

| Ingredients | Percent by Weight |
| --- | --- |
| Graphite 920 | 69.6 |
| Resin FRJ-136 | 14.3 |
| Benzoflex ® P-200 | 7.1 |
| Aluminum Stearate MG II | 4.5 |

-continued

| Ingredients | Percent by Weight |
|---|---|
| Stearic Acid (Triple Press) | 4.5 |
| Total | 100.0 |
| 1" Beam Strength (oz) | 37.8 |
| Point Strength (lbs) | 4.0 |
| Grade (Darkness) | 2½ |

EXAMPLE 4

| Ingredients | Percent by Weight |
|---|---|
| Graphite 920 | 68.2 |
| Resin FRJ-136 | 13.9 |
| Benzoflex® P-200 | 6.9 |
| Aluminum Stearate MG II | 5.5 |
| Stearic Acid (Triple Press) | 5.5 |
| Total | 100.0 |
| 1" Beam Strength (oz) | 41.0 |
| Point Strength (lbs) | 4.0 |
| Grade (Darkness) | 2½ |

EXAMPLE 5

| Ingredients | Percent by Weight |
|---|---|
| Graphite 920 | 67.4 |
| Resin FRJ-136 | 13.8 |
| Benzoflex® P-200 | 6.8 |
| Aluminum Stearate MG II | 6.0 |
| Stearic Acid (Triple Press) | 6.0 |
| Total | 100.0 |
| 1" Beam Strength (oz) | 44.2 |
| Point Strength (lbs) | 5.25 |
| Grade (Darkness) | 2½ |

EXAMPLE 6

| Ingredients | Percent by Weight |
|---|---|
| Graphite 920 | 62.1 |
| Petroleum Coke 4286 | 6.7 |
| Resin FRJ-136 | 14.2 |
| Benzoflex® P-200 | 7.0 |
| Aluminum Stearate MG II | 5.0 |
| Stearic Acid (Triple Press) | 5.0 |
| Total | 100.0 |
| 1" Beam Strength (oz) | 35.0 |
| Point Strength (lbs) | 4.75 |
| Grade (Darkness) | 3 |

EXAMPLE 7

| Ingredients | Percent by Weight |
|---|---|
| Graphite 920 | 66.7 |
| Resin FRJ-136 | 13.6 |
| Benzoflex® P-200 | 6.7 |
| Aluminum Stearate LG II | 13.0 |
| Total | 100.0 |
| 1" Beam Strength (oz) | 39.0 |
| Point Strength (lbs) | 3.5 |
| Grade (Darkness) | 2½ |

EXAMPLE 8

| Ingredients | Percent by Weight |
|---|---|
| Graphite 920 | 65.8 |

-continued

| Ingredients | Percent by Weight |
|---|---|
| Resin FRJ-136 | 13.5 |
| Benzoflex® P-200 | 6.7 |
| Aluminum Stearate LG II | 14.0 |
| Total | 100.0 |
| 1" Beam Strength (oz) | 40.0 |
| Point Strength (lbs) | 5.0 |
| Grade (Darkness) | 2 |

EXAMPLE 9

| Ingredients | Percent by Weight |
|---|---|
| Graphite 1155 | 67.4 |
| Resin FRJ-136 | 13.8 |
| Benzoflex® P-200 | 6.8 |
| Aluminum Stearate MG II | 6.0 |
| Stearic Acid (Triple Press) | 6.0 |
| Total | 100.0 |
| 1" Beam Strength (oz) | 34.7 |
| Point Strength (lbs) | 4.75 |
| Grade (Darkness) | 2½ |

EXAMPLE 10

| Ingredients | Percent by Weight |
|---|---|
| Graphite 920 | 62.1 |
| Anthracite Coal AC-6 | 6.7 |
| Resin FRJ-136 | 14.2 |
| Benzoflex® P-200 | 7.0 |
| Aluminum Stearate MG II | 5.0 |
| Stearic Acid (Triple Press) | 5.0 |
| Total | 100.0 |
| 1" Beam Strength (oz) | 38.9 |
| Point Strength (lbs) | 4.5 |
| Grade (Darkness) | 3 |

EXAMPLE 11

| Ingredients | Percent by Weight |
|---|---|
| Graphite 920 | 69.0 |
| Resin FRJ-136 | 18.0 |
| Benzoflex® P-200 | 9.0 |
| Aluminum Stearate MG II | 2.0 |
| Stearic Acid (Triple Press) | 2.0 |
| Total | 100.0 |
| 1" Beam Strength (oz) | 45.4 |
| Point Strength (lbs) | 5.25 |
| Grade (Darkness) | 4 |

EXAMPLE 12

| Ingredients | Percent by Weight |
|---|---|
| Graphite 920 | 69.0 |
| Resin SP-6201 | 18.0 |
| Benzoflex® P-200 | 9.0 |
| Aluminum Stearate MG II | 2.0 |
| Stearic Acid (Triple Press) | 2.0 |
| Total | 100.0 |
| 1" Beam Strength (oz) | 47.2 |
| Point Strength (lbs) | 5.5 |
| Grade (Darkness) | 4 |

EXAMPLE 13

| Ingredients | Percent by Weight |
|---|---|
| Graphite 920 | 65.8 |
| Resin FRJ-136 | 13.5 |
| Benzoflex ® P-200 | 6.7 |
| Aluminum Stearate MG II | 10.5 |
| Stearic Acid (Triple Press) | 3.5 |
| Total | 100.0 |
| 1" Beam Strength (oz) | 37.5 |
| Point Strength (lbs) | 4.5 |
| Grade (Darkness) | 2 |

EXAMPLE 14

| Ingredients | Percent by Weight |
|---|---|
| Graphite 920 | 64.3 |
| Resin FRJ-136 | 13.2 |
| Benzoflex ® P-200 | 6.5 |
| Aluminum Stearate MG II | 12.0 |
| Stearic Acid (Triple Press) | 4.0 |
| Total | 100.0 |
| 1" Beam Strength (oz) | 40.4 |
| Point Strength (lbs) | 4.0 |
| Grade (Darkness) | 1 |

A curing temperature of 260° F. for two hours may be used for number 1 grade cores to minimize bleeding of stearic acid.

Additional Examples of Thermoset Core Compositions for Black Leads

EXAMPLE 15

| Ingredients | Percent by Weight |
|---|---|
| Graphite 920 | 68.9 |
| Resin FRJ-136 | 14.1 |
| Benzoflex ® 2-45 | 7.0 |
| Aluminum Stearate Med Gel II | 5.0 |
| Stearic Acid (Double or Single Pressed Grades) | 5.0 |
| Total | 100.0 |

EXAMPLE 16

| Ingredients | Percent by Weight |
|---|---|
| Graphite #1845 | 68.9 |
| Resin FRJ-136 | 14.1 |
| Benzoflex ® P-200 | 7.0 |
| Aluminum Stearate Med Gel II | 5.0 |
| Stearic Acid (Triple Pressed) | 5.0 |
| Total | 100.0 |

EXAMPLE 17

| Ingredients | Percent by Weight |
|---|---|
| Graphite #1845 | 68.9 |
| Durez #12687 (phenolic novolac with hexa) | 14.1 |
| Benzoflex ® P-200 | 7.0 |
| Aluminum Stearate Med Gel II | 5.0 |
| Stearic Acid | 5.0 |
| Total | 100.0 |

EXAMPLE 18

| Ingredients | Percent by Weight |
|---|---|
| Graphite #1845 | 68.9 |
| Resin FRJ-136 | 14.1 |
| Benzoflex ® P-200 | 7.0 |
| Oleic Acid | 5.0 |
| Calcium Oleate | 5.0 |
| Total | 100.0 |

EXAMPLE 19

| Ingredients | Percent by Weight |
|---|---|
| Graphite #1845 | 68.9 |
| Resin FRJ-136 | 14.1 |
| Carbowax 1500 | 7.0 |
| Aluminum Stearate Med Gel II | 5.0 |
| Stearic Acid | 5.0 |
| Total | 100.0 |

EXAMPLE 20

| Ingredients | Percent by Weight |
|---|---|
| Graphite #1845 | 67.9 |
| Resin FRJ-136 | 14.1 |
| Benzoflex ® P-200 | 7.0 |
| Hoechst Wax OP | 1.0 |
| Aluminum Stearate Med Gel II | 5.0 |
| Stearic Acid | 5.0 |
| Total | 100.0 |

EXAMPLE 21

| Ingredients | Percent by Weight |
|---|---|
| Graphite #1845 | 51.7 |
| Graphite #508 | 17.2 |
| Resin FRJ-136 | 14.1 |
| Benzoflex ® P-200 | 7.0 |
| Aluminum Stearate Med Gel II | 5.0 |
| Stearic Acid | 5.0 |
| Total | 100.0 |

EXAMPLE 22

| Ingredients | Percent by Weight |
|---|---|
| Graphite #1845 | 66.9 |
| Resin FRJ-136 | 14.1 |
| Benzoflex ® P-200 | 7.0 |
| Aluminum Stearate Med Gel II | 5.0 |
| Stearic Acid | 5.0 |
| Carbon Black (Sterling 50) | 2.0 |
| Total | 100.0 |

EXAMPLE 23

| Ingredients | Percent by Weight |
|---|---|
| Graphite 920 | 66.6 |
| Resin RI-1815 | 16.3 |
| Benzoflex ® P-200 | 4.1 |
| Aluminum Stearate Med Gel II | 9.8 |
| Stearic Acid (Triple Press) | 3.2 |
| Total | 100.0 |
| 1" Beam Strength (oz) | 48.8 |

| -continued | |
|---|---|
| Ingredients | Percent by Weight |
| Point Strength (lbs) | 5.5 |
| Grade (Darkness) | 2¼ |

Example of a Core Composition for a Colored Lead

EXAMPLE 24

| Ingredients | Percent by Weight |
|---|---|
| Talc | 52.0 |
| Titanium Dioxide | 6.0 |
| Toluidene Toner (Red) | 5.0 |
| Lithol Rubine (Red) | 1.0 |
| Resin FRJ-136 | 13.5 |
| Benzoflex ® P-200 | 6.5 |
| Aluminum Stearate Med Gel II | 12.0 |
| Stearic Acid (Triple Press) | 4.0 |
| Total | 100.0 |

While preferred embodiments of the invention have been shown and described, it will be apparent to those skilled in the art that changes can be made in these embodiments without departing from the principles and spirit of the invention, the scope of which is defined in the appended claims. For example, the methods of the invention may be applied to the manufacture of marking or writing elements including various types of resins that may be cured to their infusible state by, e.g., heat, irradiation, and/or chemical curing or hardening agents that may or may not require heating the extrudate.

What is claimed is:

1. A composition for the manufacture of a cured extruded pencil core, comprising a blended extrudable mixture of a marking material, a phenolic novolac resin, a resin hardener, a plasticizer, and a lubricant, and wherein the ingredients of the composition have the following approximate proportions, by weight:

| Ingredient | Percentage |
|---|---|
| Marking Material | 55–75% |
| Resin (including hardener) | 10–28% |
| Plasticizer | 2–12% |
| Lubricant | 4–22% |

2. A composition in accordance with claim 1, wherein the mixture has been blended at a temperature that does not exceed about 170° F.

3. A composition in accordance with claim 2, wherein the plasticizer is a liquid at the blending temperature.

4. A composition in accordance with claim 3, wherein at least one component of the lubricant is a liquid at the blending temperature.

5. A composition in accordance with claim 1, wherein the mixture has been blended by high-intensity mixing without the addition of external heat.

6. A composition in accordance with claim 1, wherein the mixture is non-volatile.

7. A composition in accordance with claim 1, wherein the mixture is capable of being extruded at a temperature less than about 220° F. and cures at a substantially higher temperature.

8. A composition in accordance with claim 1, wherein the marking material comprises graphite.

9. A composition in accordance with claim 1, wherein the marking material is selected from the group consisting of dyes and pigments.

10. A composition in accordance with claim 8 or 9, wherein the plasticizer comprises a dibenzoate and the lubricant comprises a stearate and/or stearic acid.

11. A pencil core comprising a cured extrudate of a blended mixture of a marking material, a phenolic novolac resin, a resin hardener, a plasticizer, and a lubricant, and wherein the ingredients of the mixture have the following approximate proportions, by weight:

| Ingredient | Percentage |
|---|---|
| Marking Material | 55–75% |
| Resin (including hardener) | 10–28% |
| Plasticizer | 2–12% |
| Lubricant | 4–22%. |

12. A pencil core in accordance with claim 11, wherein the mixture was blended at a temperature that does not exceed about 170° F.

13. A pencil core in accordance with claim 12, wherein the plasticizer is a liquid at the blending temperature.

14. A pencil core in accordance with claim 13, wherein at least one compound of the lubricant is a liquid at the blending temperature.

15. A pencil core in accordance with claim 11, wherein the mixture was blended by high-intensity mixing without the addition of external heat.

16. A pencil core in accordance with claim 11, wherein the mixture extruded was non-volatile.

17. A pencil core in accordance with claim 11, wherein the marking material comprises graphite.

18. A pencil core in accordance with claim 11, wherein the marking material comprises a dye and/or a pigment.

19. A pencil core in accordance with claim 17 or 18, wherein the plasticizer comprises a dibenzoate and the lubricant comprises a stearate and/or stearic acid.

20. A method of making a pencil core, comprising blending a mixture of a marking material, a resin that may be cured to an infusible state, a plasticizer, and a lubricant, to provide an extrudable composition, extruding the composition into the form of a pencil core, and curing the extrudate, and wherein the composition consists essentially of, by weight:

| Ingredient | Percentage |
|---|---|
| Marking Material | 55–75% |
| Resin | 10–28% |
| Plasticizer | 2–12% |
| Lubricant | 4–22%. |

21. A method in accordance with claim 20, wherein the blending and extruding are conducted at material temperatures less than about 220° F. and the curing is conducted at material temperatures that are substantially higher than 220° F.

22. A method in accordance with claim 20, wherein the temperature of the mixture during blending does not exceed about 160° F., the temperature of the composition during extrusion does not exceed about 200° F., and the temperature of the extrudate during curing is at least about 260° F.

23. A method in accordance with claim 20, wherein the blended mixture is cooled and billeted and the billets are heated prior to extrusion.

24. A method in accordance with claim 23, wherein the billeted material is non-volatile.

25. A method in accordance with claim 24, wherein the billets are heated and extruded without the addition of a volatile solvent.

26. A method in accordance with claim 20, wherein the plasticizer is a liquid at the blending temperature.

27. A method in accordance with claim 26, wherein the lubricant has at least one component that is a liquid at the blending temperature.

28. A method in accordance with claim 20, wherein the resin is a thermosetting phenolic novolac resin and is cured by application of heat to the extrudate.

29. A method in accordance with claim 28, wherein the marking material comprises graphite.

30. A method in accordance with claim 29, wherein the plasticizer comprises a dibenzoate and the lubricant comprises a stearate and/or stearic acid.

31. A method in accordance with claim 20, wherein the resin, plasticizer, and lubricant form a solution at the blending temperature.

* * * * *